(12) United States Patent
Nakamura et al.

(10) Patent No.: US 10,520,725 B2
(45) Date of Patent: Dec. 31, 2019

(54) DISPLAY DEVICE AND APPARATUS

(71) Applicants: Kento Nakamura, Kanagawa (JP); Masato Kusanagi, Kanagawa (JP); Keita Katagiri, Kanagawa (JP)

(72) Inventors: Kento Nakamura, Kanagawa (JP); Masato Kusanagi, Kanagawa (JP); Keita Katagiri, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/916,498

(22) Filed: Mar. 9, 2018

(65) Prior Publication Data

US 2018/0267306 A1 Sep. 20, 2018

(30) Foreign Application Priority Data

Mar. 15, 2017  (JP) ................................ 2017-049724
Jan. 19, 2018  (JP) ................................ 2018-006988

(51) Int. Cl.
  G02B 27/01  (2006.01)
  G02B 26/10  (2006.01)

(52) U.S. Cl.
  CPC ......... G02B 27/0101 (2013.01); G02B 27/01 (2013.01); G02B 27/0179 (2013.01); *G02B 26/101* (2013.01); *G02B 26/105* (2013.01); *G02B 2027/011* (2013.01); *G02B 2027/0127* (2013.01); *G02B 2027/0145* (2013.01); *G02B 2027/0154* (2013.01); *G02B 2027/0159* (2013.01)

(58) Field of Classification Search
  CPC .... G02B 27/00; G02B 27/01; G02B 27/0101; G02B 27/0081; G02B 27/0172; G02B 27/0179; G02B 2027/011; G02B 2027/013; G02B 2027/0147
  See application file for complete search history.

(56) References Cited

U.S. PATENT DOCUMENTS

2011/0216422 A1*  9/2011  Nakazawa ............. G02B 25/00
                                                 359/643
2014/0177022 A1  6/2014  Saisho et al.
(Continued)

FOREIGN PATENT DOCUMENTS

EP       2 945 000 A1     11/2015
JP       2015-197496      11/2015
(Continued)

OTHER PUBLICATIONS

Extended European Search Report dated Jul. 25, 2018 in Patent Application No. 18157914.5.

*Primary Examiner* — Sultan Chowdhury
(74) *Attorney, Agent, or Firm* — Oblon, McClelland, Maier & Neustadt, L.L.P.

(57) ABSTRACT

A display device includes an intermediate-image formation unit configured to form an intermediate image on a screen, a projection unit configured to project the intermediate image toward a transmission/reflection member to display a virtual image, a reception unit configured to receive virtual image information about the virtual image, and a correction unit configured to rotate the intermediate image within the screen to correct a defect of the virtual image in accordance with the virtual image information.

10 Claims, 11 Drawing Sheets

(56) References Cited

U.S. PATENT DOCUMENTS

| | | | |
|---|---|---|---|
| 2015/0062716 A1* | 3/2015 | Komatsu | G02B 27/0172 |
| | | | 359/630 |
| 2015/0219803 A1 | 8/2015 | Inamoto et al. | |
| 2015/0277115 A1 | 10/2015 | Inamoto et al. | |
| 2015/0341607 A1 | 11/2015 | Kobayashi et al. | |
| 2015/0370069 A1 | 12/2015 | Saisho et al. | |
| 2016/0320615 A1 | 11/2016 | Nakamura et al. | |
| 2016/0320616 A1 | 11/2016 | Ichii | |
| 2016/0334637 A1 | 11/2016 | Saisho et al. | |
| 2016/0357014 A1 | 12/2016 | Beckman | |
| 2017/0069294 A1* | 3/2017 | Guo | G09G 3/34 |
| 2017/0154558 A1 | 6/2017 | Atsuumi et al. | |
| 2017/0184843 A1* | 6/2017 | Kuzuhara | G02B 27/0101 |
| 2017/0285338 A1* | 10/2017 | Narushima | B60K 35/00 |
| 2017/0315353 A1 | 11/2017 | Saisho et al. | |
| 2018/0143427 A1* | 5/2018 | Griffin | G02B 27/0172 |

FOREIGN PATENT DOCUMENTS

| | | |
|---|---|---|
| JP | 2015-232692 | 12/2015 |
| JP | 2016-172554 | 9/2016 |

\* cited by examiner

DISPLAY DEVICE AND APPARATUS

CROSS-REFERENCE TO RELATED APPLICATIONS

The present application claims priority under 35 U.S.C. § 119 to Japanese Patent Application No. 2017-49724, filed on Mar. 15, 2017 and Japanese Patent Application No. 2018-006988, filed on Jan. 19, 2018. The contents of which are incorporated herein by reference in their entirety.

BACKGROUND OF THE INVENTION

1. Field of the Invention

The present invention relates to a display device and an apparatus.

2. Description of the Related Art

HUDs (head-up displays) have been used as an application that allows a driver (viewer) in a movable body such as a vehicle to recognize various types of information (vehicle information, alarm information, navigation information, or the like) with less movement of the line of sight.

For example, in order to reduce distortion of virtual images presented on the front windshield of a vehicle, there is disclosure of an apparatus that includes a correction unit that deforms image information; at least one adjustment element that is adjusted to change the position of a virtual image; and a memory device that stores correction data for determining deformation of the correction unit in accordance with adjustment selected for the adjustment element (Japanese Unexamined Patent Application Publication No. 2016-172554).

In virtual images presented by a display device installed in an apparatus such as a vehicle, defects may occur due to any factors. For example, defects such as tilt, distortion, or horizontal-angle deviation sometimes occur in virtual images due to errors in a manufacturing process for manufacturing the display device, errors in an assembly process for assembling the display device in the apparatus, errors in the viewing location of a driver (viewer) in a vehicle, and the like. Therefore, to correct defects of virtual images, it is necessary to deal with errors due to any factors. Furthermore, in dealing with errors in a manufacturing process or an assembly process, some conventional methods have problems such as an increase in workload, the size of the apparatus, costs, and the like.

The present invention has been made in consideration of the foregoing, and it has an object to easily correct defects of virtual images caused by any factors.

SUMMARY OF THE INVENTION

Brief Description of the Drawings

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
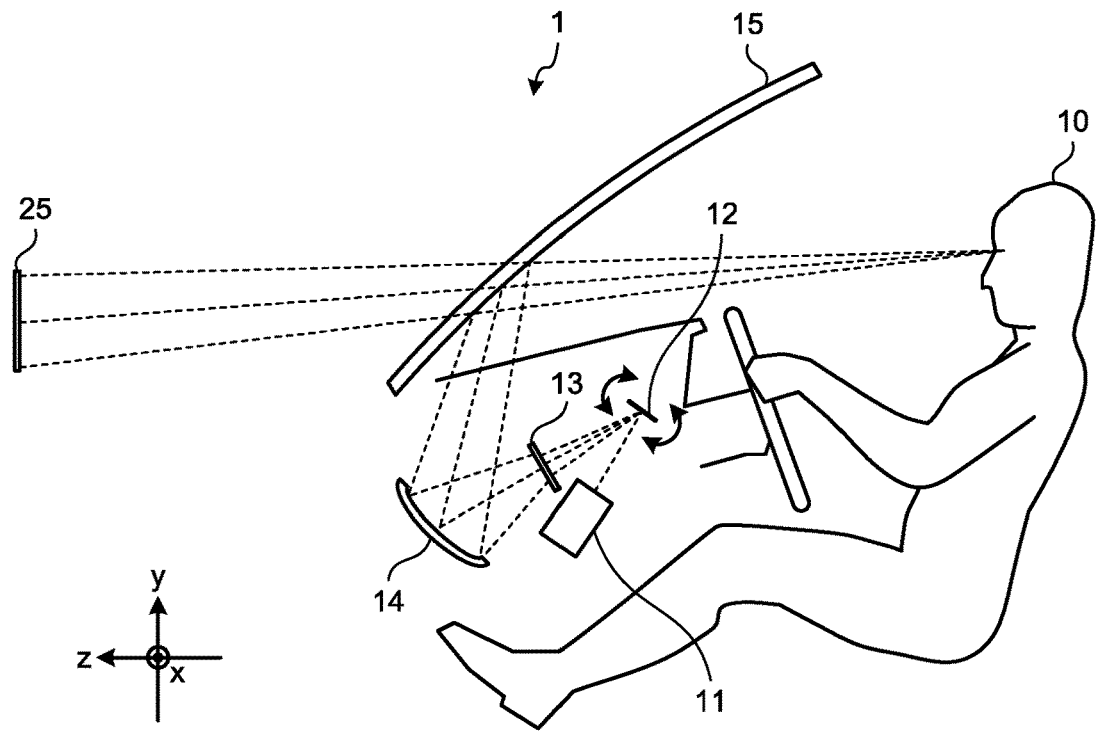
FIG. 1 is a diagram that illustrates a schematic configuration of a display device according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

With reference to the attached drawings, a detailed explanation is given below of an embodiment of a display device and an apparatus. The present invention is not limited to the following embodiments, and components in the following embodiments include the ones that may be easily developed by a person skilled in the art, substantially the same ones, and the ones in what is called a range of equivalents. The components may be variously omitted, replaced, modified, or combined without departing from the scope of the following embodiments.

First Embodiment

FIG. 1 is a diagram that illustrates a schematic configuration of a display device 1 according to a first embodiment. The display device 1 according to the present embodiment is a HUD installed in an apparatus. The apparatus may be, for example, a movable body such as vehicle, aircraft, or vessel, or a non-movable body such as maneuvering simulation system or home theater system. Hereafter, a HUD installed in a vehicle is explained as an example of the display device 1.

The display device 1 includes a light source unit 11, a scan mirror 12, a screen 13, and a concave mirror 14.

A front windshield 15 is a transmission/reflection member that has the function (partial reflection function) to transmit part of light flux and reflect the remaining part. The front windshield 15 serves as a semi-transmissive mirror that causes a viewer (driver) 10 to view the landscape ahead and a virtual image 25. The virtual image 25 provides the viewer 10 with for example vehicle information (speed, travel distance, or the like), navigation information (route guidance, traffic information, or the like), alarm information (crash alarm, or the like), and the like. The virtual image 25 may be displayed by being superimposed on the landscape ahead the front windshield 15. Furthermore, a semi-transmissive mirror (combiner) may be used as an individual transmission/reflection member that has the same function (partial reflection function) as the front windshield 15.

The light source unit 11 emits laser light. The light source unit 11 may emit laser light that is a combination of three types of laser light in colors such as R, G, and B. After being emitted from the light source unit 11, the laser light is guided to a reflective surface of the scan mirror 12.

The scan mirror 12 is a device that changes the traveling direction of laser light by using the MEMS (Micro Electro Mechanical Systems), or the like. The scan mirror 12 may be structured by using for example a mirror system that includes a single micro mirror that oscillates in two perpendicular axes or two mirrors that oscillate or rotate in one axis.

After being emitted from the scan mirror 12, the laser light scans the screen 13 so that an intermediate image, which is a two-dimensional image, is formed on the screen 13. The screen 13 has the function to diverge the laser light at a predetermined angle of divergence, and it is structured by using for example a microlens array.

As described above, the intermediate-image formation unit, which forms intermediate images, includes the light source unit 11, the scan mirror 12, and the screen 13 in the example illustrated in FIG. 1.

After being output from the screen 13, the light is reflected toward the front windshield 15 by the concave mirror 14. The concave mirror 14 is designed and arranged so as to compensate for tilt, distortion, positional deviation, or the like, of images due to a curved form of the front windshield 15. The concave mirror 14 may be rotatably mounted around a predetermined rotation axis. Thus, the reflection direction of light output from the screen 13 may be adjusted, and the display location of the virtual image 25 may be changed. With this configuration, the light for forming an intermediate image, formed on the screen 13, is enlarged and projected toward the front windshield 15 so that the viewer 10 may view the virtual image 25 due to the light reflected by the front windshield 15.

As described above, a virtual-image display unit, which displays the virtual image 25, includes the concave mirror 14 and the front windshield 15, described above, in the example illustrated in FIG. 1.

Figure 2:
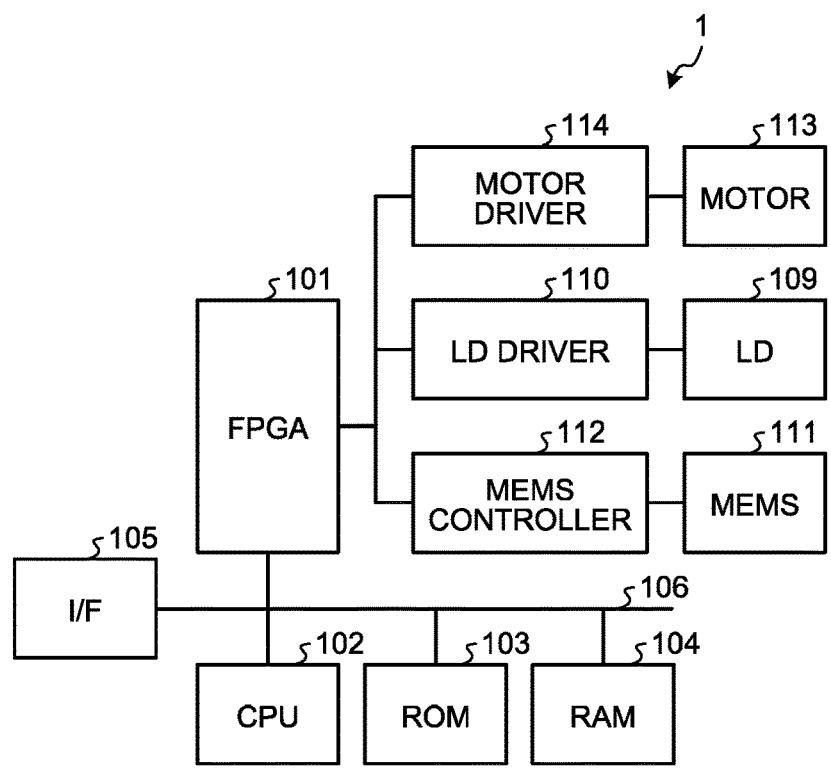
FIG. 2 is a block diagram that illustrates a hardware configuration of the display device according to the first embodiment.

FIG. 2 is a block diagram that illustrates a hardware configuration of the display device 1 according to the first embodiment. The display device 1 according to the present embodiment includes an FPGA (field-programmable gate array) 101, a CPU (central processing unit) 102, a ROM (read only memory) 103, a RAM (random access memory) 104, an I/F (interface) 105, a bus line 106, an LD (laser diode) 109, an LD driver 110, an MEMS 111, an MEMS controller 112, a motor 113, and a motor driver 114.

The LD 109 is a semiconductor light emitting element that forms part of the light source unit 11. The LD driver 110 is a circuit that generates drive signals for driving the LD 109. The MEMS 111 is a device that forms part of the scan mirror 12 and that shifts the mirror. The MEMS controller 112 is a circuit that generates drive signals for driving the MEMS 111. The motor 113 is an electric motor that rotates the rotary shaft of the concave mirror 14. The motor driver 114 is a circuit that generates drive signals for driving the motor 113. The FPGA 101 is an integrated circuit whose settings are changeable by a designer of the display device 1. The LD driver 110, the MEMS controller 112, and the motor driver 114 generate drive signals in accordance with control signals from the FPGA 101. The CPU 102 is an integrated circuit that performs operation to control the overall display device 1. The ROM 103 is a storage device that stores programs for controlling the CPU 102. The RAM 104 is a storage device that serves as a work area for the CPU 102. The I/F 105 is an interface for communicating with external devices, and it is connected to a CAN (controller area network) of a vehicle, or the like.

Figure 3:
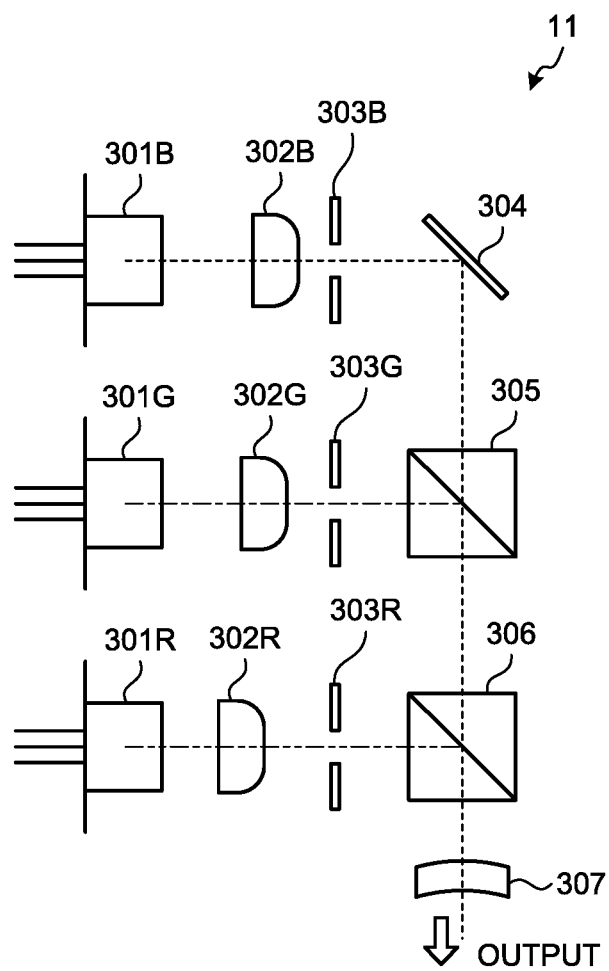
FIG. 3 is a diagram that illustrates a specific configuration of a light source unit according to the first embodiment.

FIG. 3 is a diagram that illustrates a specific configuration of the light source unit 11 according to the first embodiment. The light source unit 11 according to the present embodiment includes light source elements 301R, 301G, and 301B, coupling lenses 302R, 302G, and 302B, apertures 303R, 303G, and 303B, synthetic elements 304, 305, 306, and a lens 307. The light source elements 301R, 301G, and 301B for the three colors (R, G, and B) are LDs that each have one or more emission points, and they emit light fluxes with different wavelengths λR, λG, and λB (e.g., λR=640 nm, λG=530 nm, and λB=445 nm). The emitted light fluxes are coupled by the respective coupling lenses 302R, 302G, and 302B. The coupled light fluxes are shaped by the respective apertures 303R, 303G, and 303B. The apertures 303R, 303G, and 303B have a shape (e.g., circular, oval, rectangle, or square) that corresponds to a predetermined condition, such as the angle of divergence of a light flux. The light fluxes shaped by the apertures 303R, 303G, and 303B are synthesized by the three synthetic elements 304, 305, and 306. The synthetic elements 304, 305, and 306 are plate-like or prism-like dichroic mirrors, and they reflect or transmit light fluxes in accordance with wavelengths to synthesize them into a single light flux. The synthesized light flux is passed through the lens 307 and is guided to the scan mirror 12.

Figure 4:
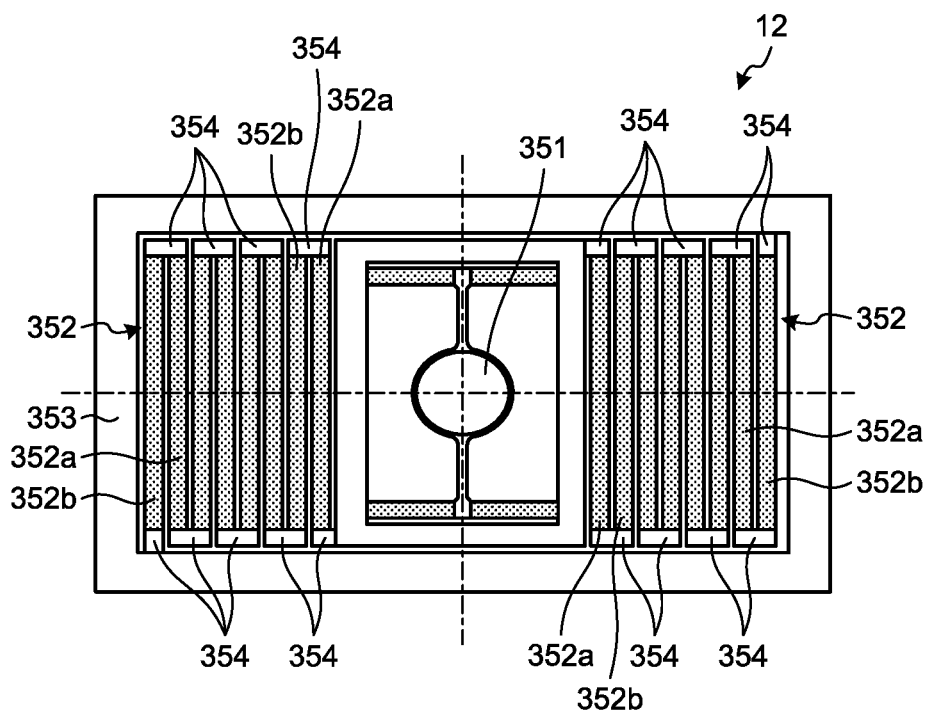
FIG. 4 is a diagram that illustrates a specific configuration of a scan mirror according to the first embodiment.

FIG. 4 is a diagram that illustrates a specific configuration of the scan mirror 12 according to the first embodiment. The scan mirror 12 according to the present embodiment is an MEMS mirror that is manufactured during a semiconductor process, and it includes a mirror 351, serpentine bridge portions 352, a frame member 353, and piezoelectric members 354. The mirror 351 has a reflective surface that reflects a laser light, emitted from the light source unit 11, toward the screen 13. The pair of serpentine bridge portions 352 is formed with the mirror 351 interposed therebetween. The serpentine bridge portions 352 include fold-over portions, and the fold-over portions include first bridge portions 352a and second bridge portions 352b that are alternately arranged. The serpentine bridge portions 352 are supported by the frame member 353. The piezoelectric member 354 is provided to connect the first bridge portion 352a and the second bridge portion 352b that are adjacent to each other. The piezoelectric member 354 applies different voltages to the first bridge portion 352a and the second bridge portion 352b so as to reflex each of the bridge portions 352a, 352b. Thus, the adjacent bridge portions 352a, 352b are deflected in different directions. Due to accumulation of deflection, the mirror 351 rotates in a vertical direction around an axis in a horizontal direction. With this configuration, optical scanning in a vertical direction is enabled with a low voltage. Optical scanning in a horizontal direction around an axis in a vertical direction is conducted due to resonance using a torsion bar, or the like, connected to the mirror 351.

Figure 5:
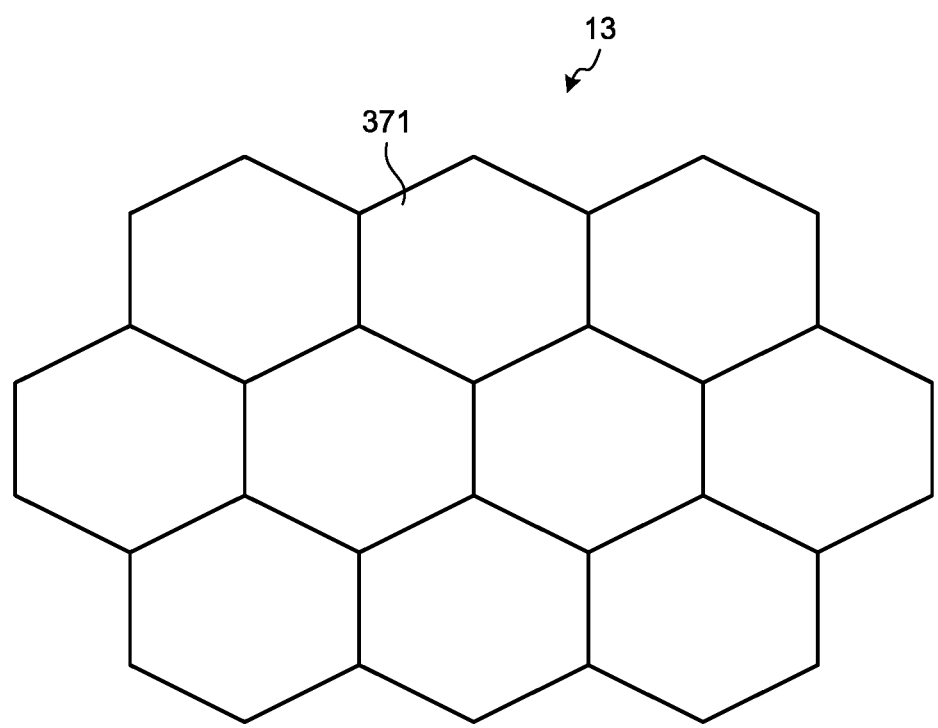
FIG. 5 is a diagram that illustrates a specific configuration of a screen according to the first embodiment.

FIG. 5 is a diagram that illustrates a specific configuration of the screen 13 according to the first embodiment. The screen 13 according to the present embodiment has a microlens array structure where hexagonal microlenses 371 are arranged without any space. The screen 13 causes laser light emitted from the scan mirror 12 to diverge at a predetermined angle of divergence. The width (the distance between two opposing sides) of the microlens 371 may be approximately 200 μm. As the microlens 371 is hexagonal, the microlenses 371 may be arranged in high density. Furthermore, the shape of the microlens 371 may be not only hexagonal but also, for example, square or triangle. In the structure described in the present embodiment, the microlenses 371 are arranged regularly; however, this is not a limitation on the arrangement of the microlenses 371, and the arrangement may be irregular by for example making the center of each of the microlenses 371 eccentric with respect to each other. If this eccentric arrangement is used, each of the microlenses 371 has a different shape from each other.

Figure 6:
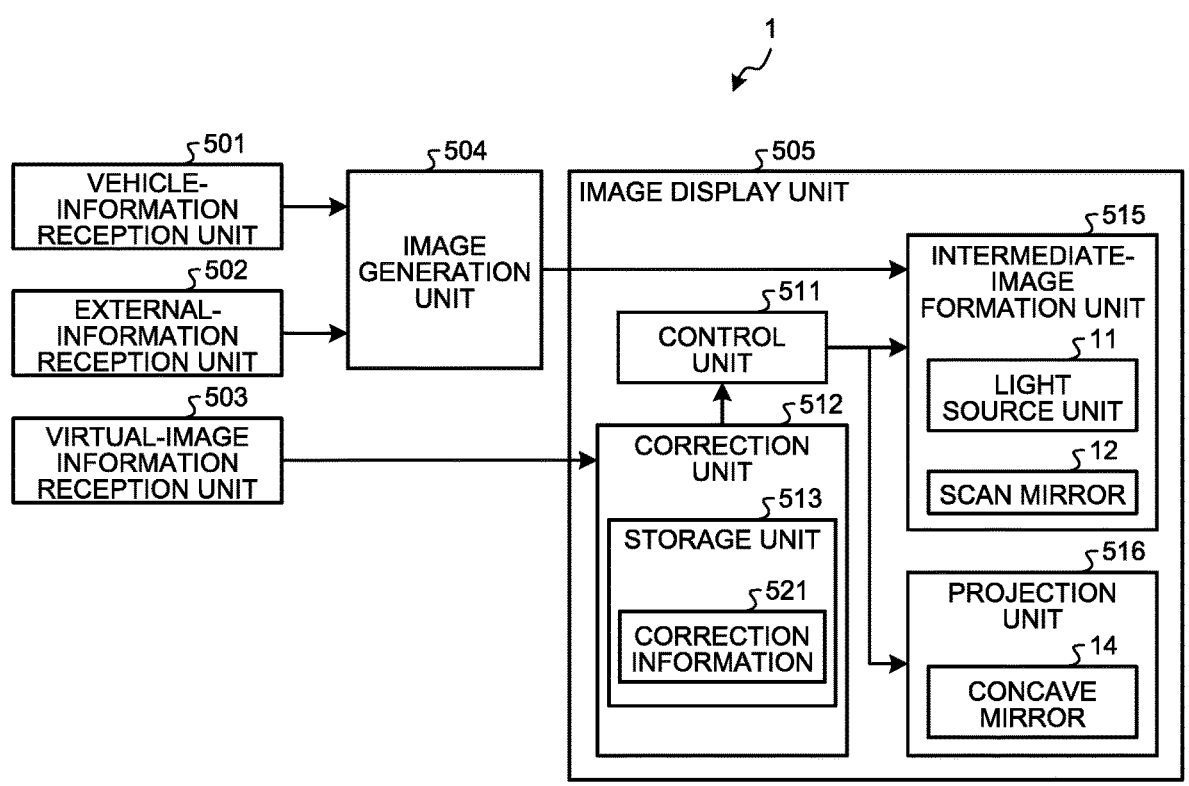
FIG. 6 is a block diagram that illustrates a functional configuration of the display device according to the first embodiment.

FIG. 6 is a block diagram that illustrates a functional configuration of the display device 1 according to the first embodiment. The display device 1 according to the present embodiment includes a vehicle-information reception unit 501, an external-information reception unit 502, a virtual-image information reception unit (reception unit) 503, an image generation unit 504, and an image display unit 505. The image display unit 505 includes a control unit 511, a correction unit 512, an intermediate-image formation unit 515, and a projection unit 516. The correction unit 512 includes a storage unit 513. The storage unit 513 stores correction information 521. The intermediate-image formation unit 515 includes the light source unit 11 and the scan mirror 12. The projection unit 516 includes the concave mirror 14.

The vehicle-information reception unit 501 is a functional unit that receives information (information on a speed, travel distance, or the like) about a vehicle from the CAN, or the like. The vehicle-information reception unit 501 is configured by the I/F 105, the CPU 102, programs stored in the ROM 103, and the like.

The external-information reception unit 502 is a functional unit that receives information outside a vehicle (positional information from the GPS, route information from a navigation system, traffic information, or the like) from an external network. The external-information reception unit 502 is configured by the I/F 105, the CPU 102, programs stored in the ROM 103, and the like.

The virtual-image information reception unit 503 is a functional unit that receives virtual image information that indicates a display state of the virtual image 25. The virtual image information includes information about defects of the virtual image 25, such as tilt, distortion, or horizontal-angle deviation. The method for receiving virtual image information is not particularly limited. For example, the information generated during a manufacturing process of the display device 1 may be received, the information generated during an assembly process for assembling the display device 1 in an apparatus (a vehicle according to the present embodiment) may be received, or the information generated based on operation performed on an operating unit by the viewer 10 who is using the display device 1 may be received. The virtual-image information reception unit 503 is configured by the I/F 105, the CPU 102, programs stored in the ROM 103, and the like.

The image generation unit 504 is a functional unit that determines the structures of the virtual image 25 and an intermediate image on the basis of the information received by the vehicle-information reception unit 501 and the external-information reception unit 502 and generates the display information for displaying the virtual image 25 and the intermediate image. The image generation unit 504 is configured by the I/F 105, the CPU 102, programs stored in the ROM 103, and the like.

The image display unit 505 is a functional unit that forms an intermediate image on the screen 13 on the basis of the display information generated by the image generation unit 504 and projects the light forming the intermediate image to the front windshield 15 so as to display the virtual image 25. The image display unit 505 is configured by the CPU 102, the FPGA 101, the ROM 103, the RAM 104, the LD 109, the LD driver 110, the MEMS 111, the MEMS controller 112, the motor 113, the motor driver 114, and the like. The image display unit 505 forms an intermediate image on the screen 13 by using the intermediate-image formation unit 515 that includes the light source unit 11 and the scan mirror 12 and projects the light forming the intermediate image to the transmission/reflection member (the front windshield 15, or the like) by using the projection unit 516 that includes the concave mirror 14, thereby causing the viewer 10 to view the virtual image 25.

The image display unit 505 includes the control unit 511. The control unit 511 generates control signals for controlling operation of the light source unit 11 and the scan mirror 12 to form intermediate images. Furthermore, the control unit 511 generates control signals for controlling operation of the concave mirror 14 to display the virtual image 25 at a predetermined position.

The image display unit 505 further includes the correction unit 512. The correction unit 512 performs a process to correct defects of the virtual image 25 on the basis of the virtual image information received by the virtual-image information reception unit 503. Types of defect of the virtual image 25 are not particularly limited, and they may be for example tilt, distortion, horizontal-angle deviation (deviation of the superimposition location of the virtual image 25 in a horizontal direction), or vertical-angle deviation (deviation of the superimposition location of the virtual image 25 in a vertical direction) of the virtual image 25. The correction unit 512 performs an operation to rotate, move, or the like, an intermediate image within the screen 13 so as to correct a defect of the virtual image 25. The correction process performed by the correction unit 512 is described later. Furthermore, the correction unit 512 includes the storage unit 513 that stores the correction information 521. The correction information 521 is information that is generated on the basis of the virtual image information received by the virtual-image information reception unit 503 and is used to rotate, move, or the like, an intermediate image. The correction information 521 may be for example the information for changing control details (emission timing by the light source unit 11, operation of the scan mirror 12, and the like) for the intermediate-image formation unit from the normal state. The correction information 521 is information that changes depending on the usage situation of the display device 1 as defects of the virtual image 25 change due to individual variability of the display device 1, the apparatus, or the viewer 10. The correction unit 512 performs a unique correction process depending on the usage situation of the display device 1 on the basis of the correction information 521 stored in the storage unit 513.

Figure 7:
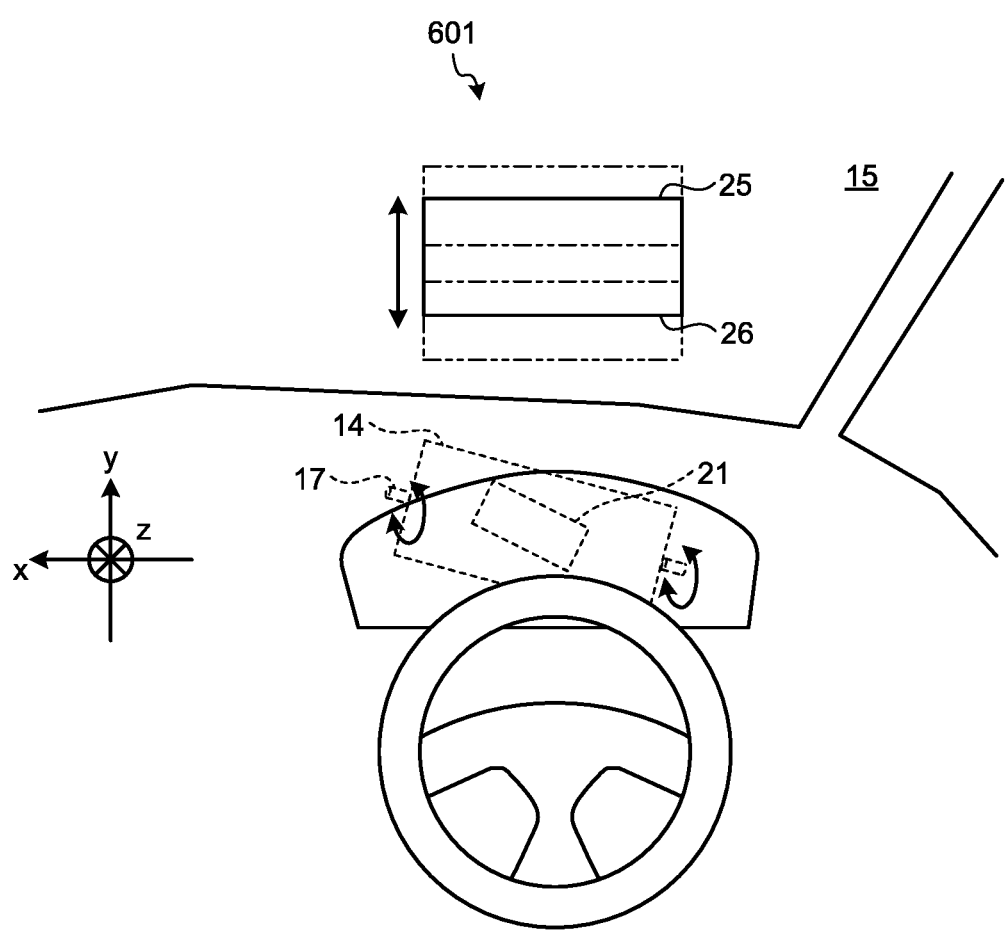
FIG. 7 is a diagram that illustrates the relationship between an intermediate image and a virtual image according to the first embodiment.

FIG. 7 is a diagram that illustrates the relationship between an intermediate image 21 and the virtual image 25 according to the first embodiment. The light output from the screen 13, on which the intermediate image 21 is formed, is reflected by the concave mirror 14 and is emitted to the front windshield 15 through an opening section formed on the top of the dashboard so that the viewer 10 can view the virtual image 25. The concave mirror 14 is provided such that it is rotatable around a rotary shaft 17. Due to rotation of the concave mirror 14, the reflection angle of the light emitted from the screen 13 is changed so that the position of the virtual image 25 is changed in a vertical direction. By adjusting the angle of the concave mirror 14 in this way, vertical-angle deviation of the virtual image 25 may be corrected.

The rotary shaft 17 according to the present embodiment is tilted with respect to the X axis (the axis in a horizontal direction of the vehicle) or a horizontal-direction axis 26 of the virtual image 25 so as to compensate for changes in the virtual image 25 due to a curved form of the front windshield 15. Furthermore, the intermediate image 21 projected onto the concave mirror 14 is also tilted with respect to the X axis or the horizontal-direction axis 26.

Figure 8:
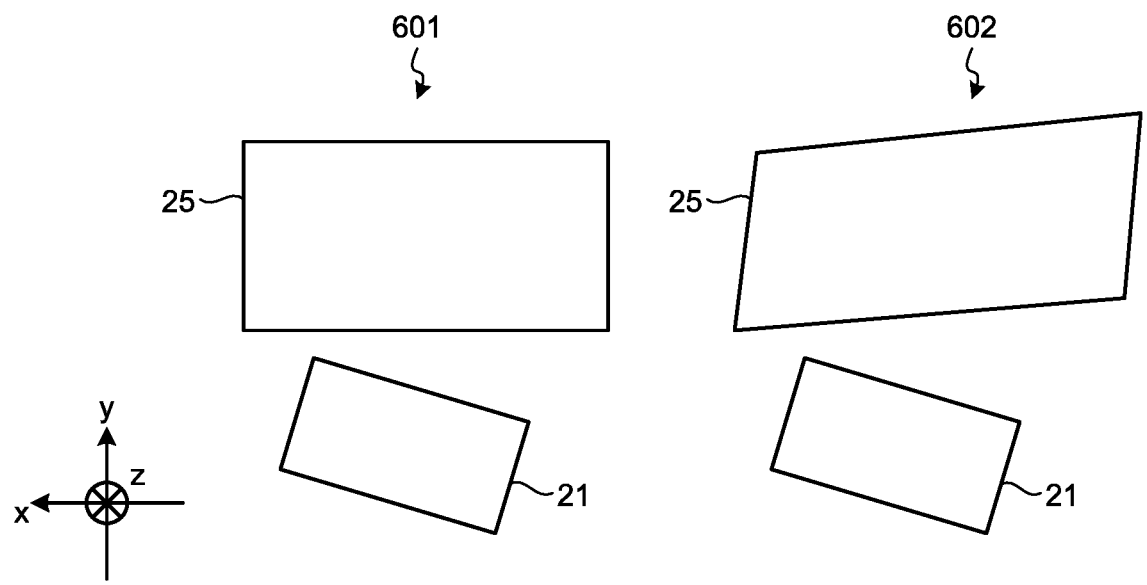
FIG. 8 is a diagram that illustrates tilt and distortion of the virtual image according to the first embodiment.

FIG. 8 is a diagram that illustrates tilt and distortion of the virtual image 25 according to the first embodiment. The left section of FIG. 8 illustrates the intermediate image 21 and the virtual image 25 in an ideal state 601. The right section of FIG. 8 illustrates the intermediate image 21 and the virtual image 25 in a non-ideal state 602. According to the present embodiment, the virtual image 25 is rectangular in the ideal state 601. Conversely, the virtual image 25 is tilted or distorted in the non-ideal state 602, and its rectangle has a shape such that it is unsymmetrically expanded or reduced in a vertical direction and in a horizontal direction. In the two states 601, 602, the display state of the intermediate image 21 is identical. As described above, there is a case where, even though the display state of the intermediate image 21 is kept the same, the virtual image 25 has a defect as illustrated in the non-ideal state 602.

There are various potential factors that cause a state where the virtual image 25 has a defect and, for example, they can be errors in a manufacturing process of the display device 1, an assembly process for assembling the display device 1 in the apparatus (the vehicle according to the present embodiment), the viewing location of the viewer 10, or the like. For example, the manufacturing process is a process that includes installation of at least one component included in the display device 1, assembly of the display device 1, examination of the assembled display device 1, shipment of the display device 1, or the like. The assembly process is a process that includes, for example, installation of the display device 1 that has been shipped (examined), assembly of the installed display device 1 in the apparatus, examination of the display device 1 in a state where it is assembled in the apparatus, shipment of the apparatus, or the like.

Figure 9:
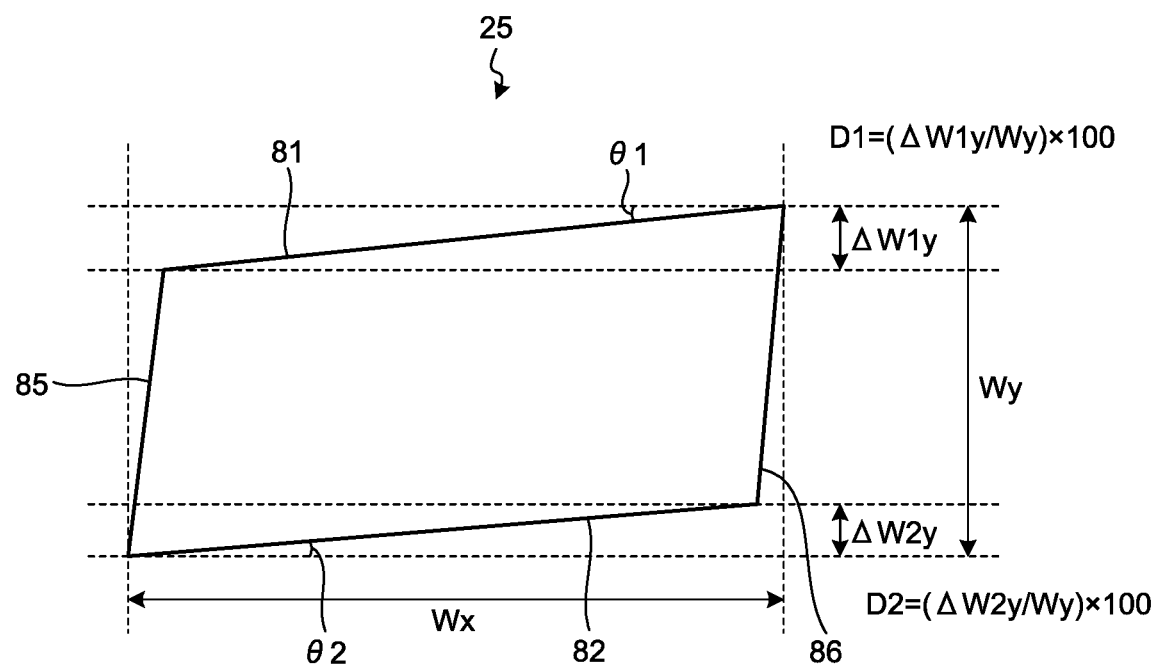
FIG. 9 is a diagram that illustrates a method for calculating tilt or distortion of the virtual image according to the first embodiment.

FIG. 9 is a diagram that illustrates a method for calculating tilt or distortion of the virtual image 25 according to the first embodiment. Here, an explanation is given of tilt and distortion of sides 81, 82 in the longitudinal direction of the virtual image 25; however, the same calculation method is applicable to sides 85, 86 in the lateral direction. In FIG. 9, Wx is the width of the virtual image 25 in the longitudinal direction, and Wy is the width of the virtual image 25 in the lateral direction. $\Delta W1y$ is the amount of change in width with regard to the upper sections of the sides 85, 86 of the virtual image 25 in the lateral direction, and $\Delta W2y$ is the amount of change in width with regard to the lower sections of the sides 85, 86 of the virtual image 25 in the lateral direction.

If tilt of an upper side 81 in the longitudinal direction is $\theta 1$ and tilt of a lower side 82 in the longitudinal direction is $\theta 2$, $\theta 1 = \arctan(\Delta W1y/Wx)$ and $\theta 2 = \arctan(\Delta W2y/Wx)$ may be represented. $\theta 1$ and $\theta 2$ may be different values from each other depending on a condition, such as a manufacturing process, an assembly process, or a viewing location. For example, a larger value between $\theta 1$ and $\theta 2$, an average value of $\theta 1$ and $\theta 2$, or the like, may be treated as the tilt of the entire virtual image 25.

Furthermore, if distortion of an upper section of the virtual image 25 is D1 and distortion of a lower section of the virtual image 25 is D2, $D1 = (\Delta W1y/Wy) \times 100$ and $D2 = (\Delta W2y/Wy) \times 100$ may be represented. Similarly to $\theta 1$ and $\theta 2$, D1 and D2 may be different values from each other depending on a condition, such as a manufacturing process, an assembly process, or a viewing location. For example, a larger value between D1 and D2, an average value of D1 and D2, or the like, may be treated as the distortion of the entire virtual image 25.

Although the tilt and the distortion at four corners of the virtual image 25 are mentioned above, this is the exemplified point for evaluating the visibility of the virtual image 25, and the point for evaluating the visibility is not limited to the above-described example. Visibility of the virtual image 25 may be evaluated from points other than the above.

Figure 10:
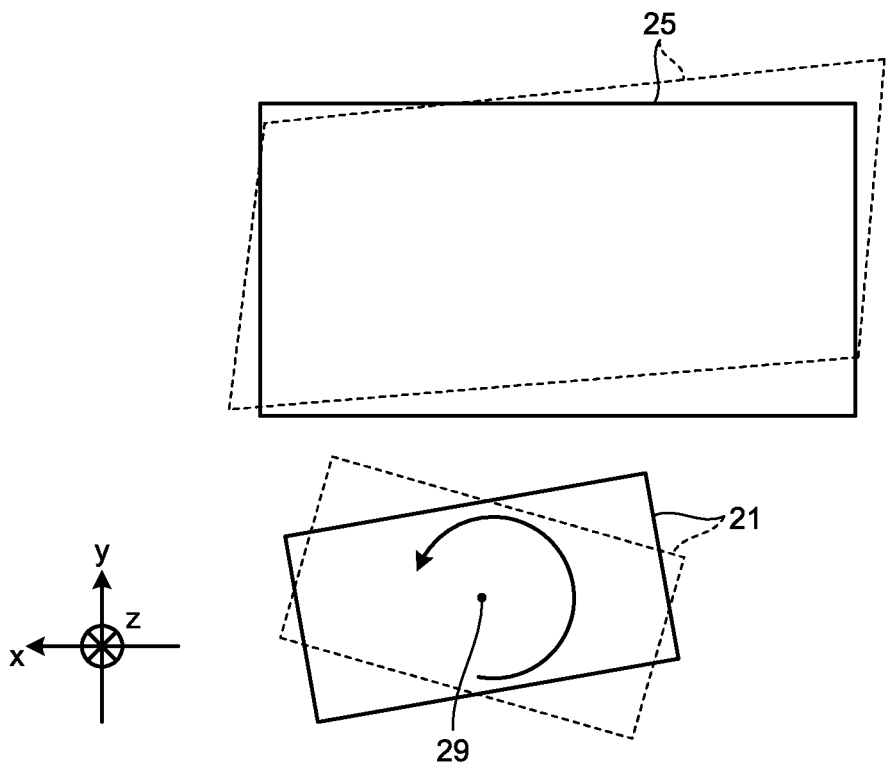
FIG. 10 is a diagram that illustrates a method for correcting tilt and distortion according to a first example of the first embodiment.

FIG. 10 is a diagram that illustrates a method for correcting tilt and distortion according to a first example of the first embodiment. In FIG. 10, dotted lines denote the intermediate image 21 before correction and the virtual image 25 before correction, and solid lines denote the intermediate image 21 after correction and the virtual image 25 after correction. Before correction, the virtual image 25 is tilted and distorted. After correction, the virtual image 25 is an ideal rectangle.

According to this example, the intermediate image 21 is rotated so that the virtual image 25 is less tilted and distorted. According to this example, the pre-correction intermediate image 21 is rotated in the direction of the arrow around the rotation axis that is an axis that passes through a rotation center 29 and is perpendicular to the plane of the intermediate image 21 so that it is shifted to the position of the post-correction intermediate image 21. Thus, tilt and distortion of the pre-correction virtual image 25 are corrected, whereby the post-correction virtual image 25 or the similar virtual image 25 may be viewed.

It is preferable that the rotation center 29 is the center of the intermediate image 21. This is because the virtual image 25 is rotated such that the center position of the virtual image 25 and the depression angle from the viewing location are not changed so that it is possible to reduce uncomfortable feelings and stress of the viewer 10 during correction. Furthermore, it is preferable that the rotation plane of the virtual image 25 is a plane perpendicular to the traveling direction of light that enters the screen 13. This is because the degree of rotation of the intermediate image 21 is efficiently applied to the rotation of the virtual image 25. Furthermore, it is preferable that the rotation range of the intermediate image 21 is approximately ±6.0 deg in consideration of variation of each component included in the display device 1. By ensuring this rotation range, it is possible to deal with almost every tilt and distortion that is caused due to errors in a manufacturing process, an assembly process, a viewing location, or the like.

Furthermore, the rotation center 29 and the rotation plane are not limited to the above. For example, the rotation center 29 may be any location in or out of the plane of the screen 13. The rotation plane may be a plane that forms an angle other than a right angle with respect to the traveling direction of light that enters the screen 13. Furthermore, the screen 13 is not limited to a flat surface, and it may include a curved surface.

Methods for rotating the intermediate image 21 are roughly divided into two types. A first method is to rotate a physical mechanism for forming the intermediate image 21. For example, the method is to mechanically rotate a device, such as the light source unit 11, the scan mirror 12, or the screen 13, included in the intermediate-image formation unit. Unfortunately, this method has significant problems such as an increase in workload, the size of the apparatus, or costs.

A second method is to rotate only the intermediate image 21 within the screen 13. For example, the control unit 511 (see FIG. 6) controls the emission timing of the light source unit 11, operation of the scan mirror 12, or the like, so as to rotate only the intermediate image 21. According to this type of method, it is possible to easily compensate for tilt and distortion with regard to any factor (a manufacturing process, an assembly process, a viewing location, or the like) without increasing workload, the size of the apparatus, costs, or the like. Control is performed by the control unit 511 in accordance with for example the following algorithm. With regard to all or part of the intermediate image 21 formed on the screen 13, a polynomial for linearly moving a pixel is calculated on the basis of the amount of deviation from the reference location, and by using the calculated polynomial, geometric transformation is conducted to move the pixel to the target reference location. Thus, all or part of the intermediate image 21 that deviates from the reference location may be rotated to the reference location.

Figure 11:
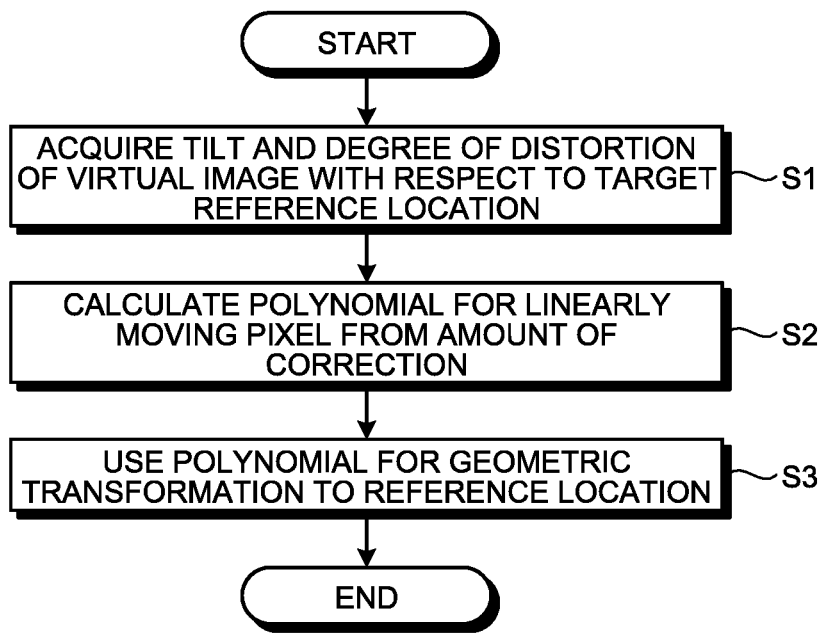
FIG. 11 is a flowchart that illustrates an algorithm for a correction process according to the first embodiment.

FIG. 11 is a flowchart that illustrates an algorithm for the correction process according to the first embodiment. The control unit 511 first acquires the tilt and the degree of distortion of the virtual image 25 with respect to the target reference location (S1). Then, the control unit 511 calculates the amount of correction for a pixel included in the intermediate image 21 formed on the screen 13 in accordance with the tilt and the degree of distortion that have been acquired and calculates a polynomial for linearly moving the pixel from the amount of correction (S2). Then, the control unit 511 uses the calculated polynomial to control emission of the light source unit 11, thereby conducting geometric transformation to move the pixel to the reference location (S3). Furthermore, the present embodiment is not a limitation as long as the objective is achieved. For example, although the tilt or the degree of distortion of the virtual image 25 is acquired based on the target reference location according to the present embodiment, the tilt or the degree of distortion may be an approximate value that is experimentally obtained.

Figure 12:
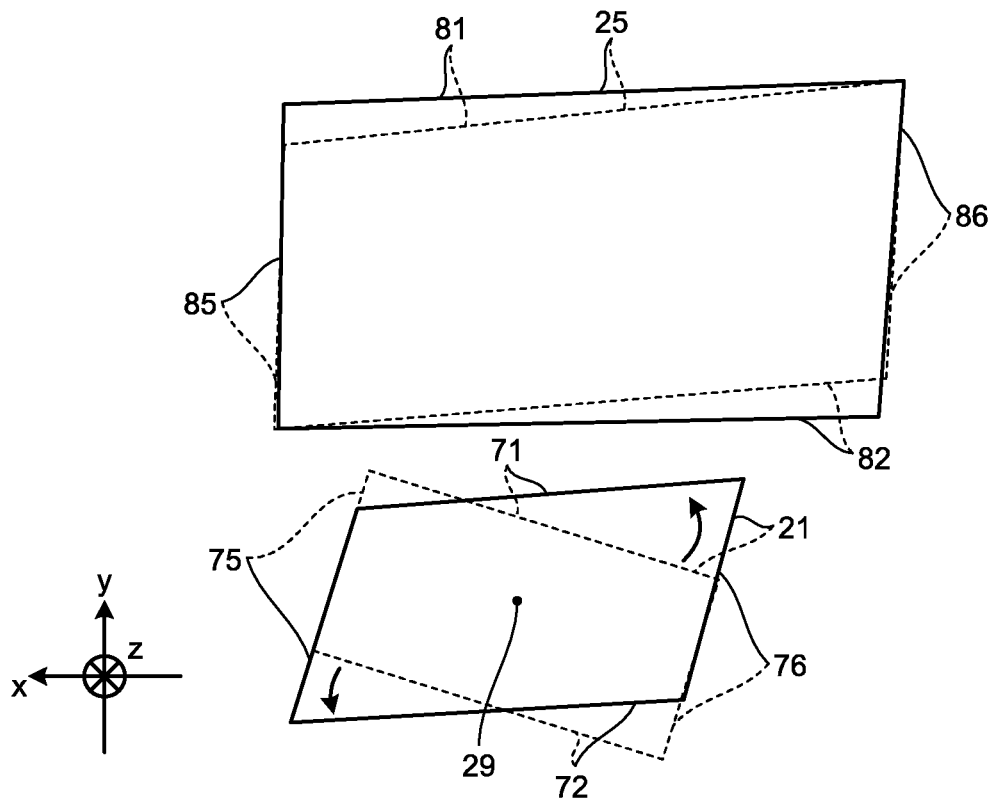
FIG. 12 is a diagram that illustrates a method for correcting tilt and distortion according to a second example of the first embodiment.

FIG. 12 is a diagram that illustrates a method for correcting tilt and distortion according to a second example of the first embodiment. In the correction method according to the second example, when the intermediate image 21 is rotated, only sides 71, 72 in the longitudinal direction are rotated. Here, sides 75, 76 in the lateral direction are not rotated but moved in a parallel fashion. The rotation center 29 may be at any location. This type of correction method may reduce tilt and distortion of the virtual image 25. That is, the sides 81, 82 in the longitudinal direction are largely corrected as compared with the sides 85, 86 in the lateral direction so that tilt and distortion of the virtual image 25 may be properly corrected. According to this type of correction method, the effective diameter of the screen 13 may be smaller and the size of the screen 13 may be reduced as compared with rotating the entire intermediate image 21 as in the first example illustrated in FIG. 10. Furthermore, the correction method according to this example may be conducted by calculating a polynomial for rotating only the sides 71, 72 in the longitudinal direction by using the algorithm that is the same as the one (the algorithm illustrated in FIG. 11) for the correction method according to the first example.

Tilt and distortion of the virtual image 25 are dissolved into an element in the longitudinal direction (the X-axis direction) and an element in the lateral direction (the Y-axis direction). Tilt with respect to the longitudinal direction is calculated from changes in position in the longitudinal direction of the virtual image 25, and it is represented by tilting in the lateral direction. Specifically, as understood from FIG. 9, tilt with respect to the longitudinal direction is calculated from the amount of tilt from the lateral-direction axis (the Y axis) when the line segment extending in the lateral direction (the Y-axis direction) is formed on the sides 81, 82 in the longitudinal direction of the virtual image 25. In the same manner, tilt with respect to the lateral direction is calculated from changes in position in the lateral direction of the virtual image 25, and it is represented by tilting in the longitudinal direction. Specifically, as understood from FIG. 9, tilt with respect to the lateral direction is calculated from the amount of tilt from the longitudinal-direction axis (the X axis) when the line segment extending in the longitudinal direction (the X-axis direction) is formed on the sides 85, 86 in the lateral direction of the virtual image 25. Furthermore, distortion with respect to the longitudinal direction is a value represented in percentage from the value obtained by dividing the amount of change, calculated from changes in position in the longitudinal direction of the virtual image 25, by the width of the image in the longitudinal direction. In the same manner, distortion with respect to the lateral direction is a value represented in percentage from the value obtained by dividing the amount of change, calculated from changes in position in the lateral direction of the virtual image 25, by the width of the image in the lateral direction. Tilt and distortion in the longitudinal direction represent tilt and distortion of the vertical line represented in the virtual image 25, and tilt and distortion in the lateral direction represent tilt and distortion of the horizontal line represented in the virtual image 25.

Here, it can be said that the front windshield 15 is a primary factor of occurrence of tilt and distortion in the virtual image 25. This is because while the display device 1 is an optical technology product and it is configured by using optical components that are processed with a high accuracy, the front windshield 15 is processed with a lower accuracy as compared with the optical components and there is a relatively high possibility that a positional deviation occurs during mounting in a vehicle body. Therefore, errors caused by the front windshield 15 are likely to be larger than errors caused by the display device 1 itself. Particularly, when the front windshield 15 is mounted in a vehicle body, errors in leaning components in the direction of weight of the front windshield 15 are likely to be large. Furthermore, the curved form of the front windshield 15 is one of the reasons that errors easily occur. For these reasons, tilt and distortion principally occur in the virtual image 25 in the lateral direction (the Y-axis direction), and tilt and distortion in the longitudinal direction (the X-axis direction) is relatively small. Therefore, with the correction method for rotating only the sides 71, 72 in the longitudinal direction of the intermediate image 21 as in the second example illustrated in FIG. 12, tilt and distortion of the virtual image 25 may be sufficiently corrected in a substantial way. According to the correction method in which the sides 75, 76 in the lateral direction are not rotated as described above, the effective diameter of the screen 13, on which the intermediate image 21 is formed, does not need to be excessively large, and therefore an increase in the size of the apparatus may be prevented.

As described above, according to the first embodiment, tilt and distortion of the virtual image 25 are corrected by rotating the intermediate image 21. Thus, for example, during a manufacturing process of the display device 1, correction may be conducted to eliminate manufacturing errors in the display device 1. Furthermore, during an assembly process for assembling the display device 1 in an apparatus, such as a vehicle, correction may be conducted to eliminate assembly errors (e.g., errors in the curved form of the front windshield 15 or errors in an installation angle of the front windshield 15) in the display device 1. Furthermore, correction may be conducted to eliminate errors in the viewing location of the viewer 10 while the viewer 10 is using the display device 1. Thus, it is possible to easily correct defects of virtual images due to any factors without increasing workload, the size of the apparatus, costs, and the like.

Second Embodiment

Figure 13:
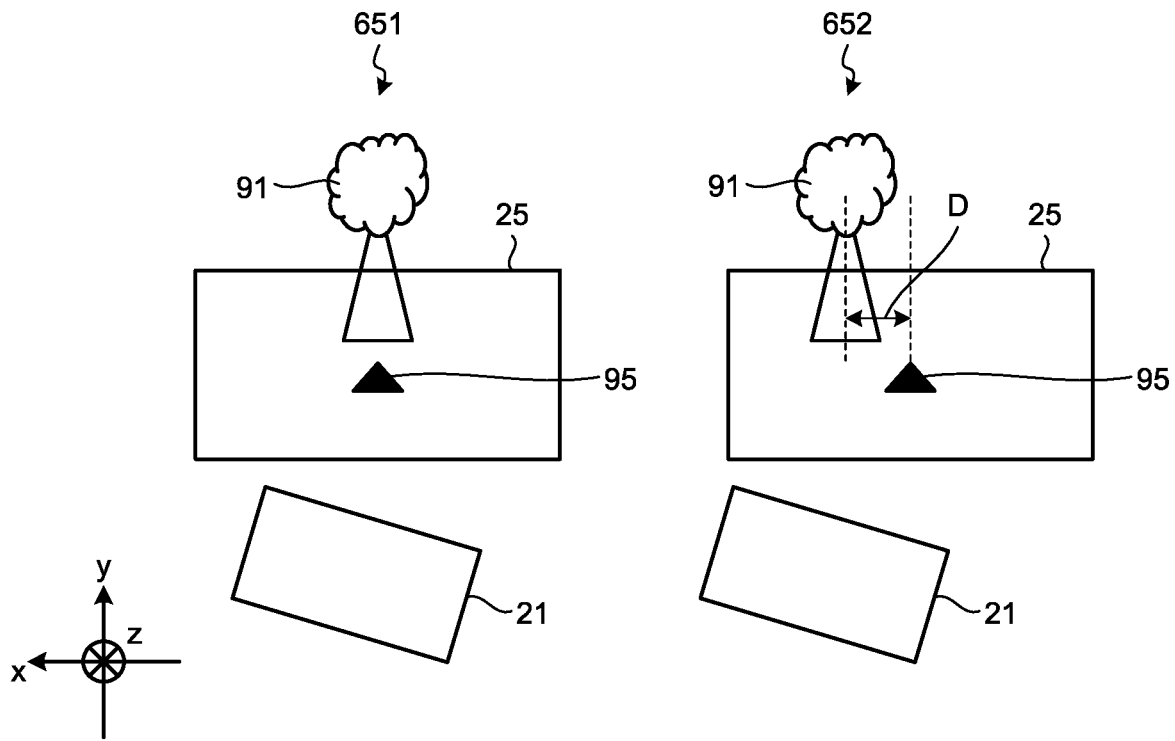
FIG. 13 is a diagram that illustrates horizontal-angle deviation of the virtual image according to a second embodiment.

Another embodiment is explained below. FIG. 13 is a diagram that illustrates horizontal-angle deviation of the virtual image 25 according to a second embodiment. The display device 1 according to the present embodiment enables correction on horizontal-angle deviation of the virtual image 25. The left section of FIG. 13 illustrates the intermediate image 21 and the virtual image 25 in an ideal state 651. The right section of FIG. 13 illustrates the intermediate image 21 and the virtual image 25 in a non-ideal state 652. In the ideal state 651, display information 95 in the virtual image 25 is presented such that it is properly superimposed on a superimposition object 91 that is viewed through the front windshield 15. Conversely, in the non-ideal state 652, the display information 95 is presented such that it deviates from the superimposition object 91 in a horizontal angle direction (the Y axis direction) by an amount of deviation D.

If a manufacturing process, an assembly process, a viewing location, or the like, satisfies an ideal condition, the predetermined display information 95 in the virtual image 25 is presented by being properly superimposed on the superimposition object 91, as illustrated in the state 651. Conversely, if an error occurs in a manufacturing process, an assembly process, a viewing location, or the like, the display information 95 is sometimes presented by being shifted from the superimposition object 91 in a horizontal angle direction, as illustrated in the state 652.

Figure 14:
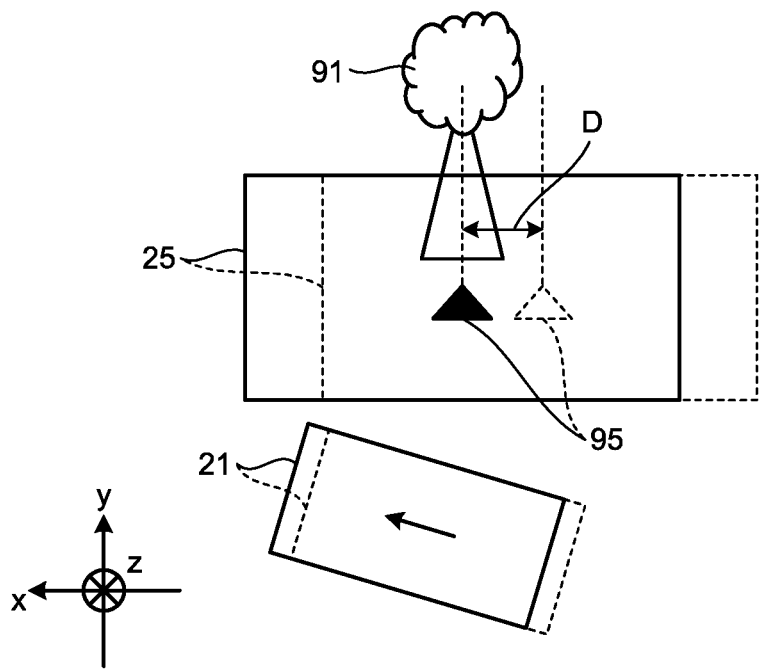
FIG. 14 is a diagram that illustrates a method for correcting horizontal-angle deviation according to the second embodiment.

FIG. 14 is a diagram that illustrates a method for correcting horizontal-angle deviation according to the second embodiment. In FIG. 14, dotted lines denote the intermediate image 21 before correction and the virtual image 25 before correction, and solid lines denote the intermediate image 21 after correction and the virtual image 25 after correction. In the pre-correction virtual image 25, the position of the display information 95 deviates from the position of the superimposition object 91 by the amount of deviation D. In the post-correction virtual image 25, the position of the display information 95 matches the position of the superimposition object 91.

According to the present embodiment, the intermediate image 21 is moved such that the amount of deviation D of the virtual image 25 decreases. In the example illustrated in FIG. 14, the pre-correction intermediate image 21 is moved in the direction of the arrow in a parallel fashion. Accordingly, the pre-correction virtual image 25 indicated by a dashed line moves close to the post-correction (ideal) virtual image 25 indicated by a solid line. Thus, horizontal-angle deviation of the virtual image 25 is corrected, and the display information 95 is presented by being properly superimposed on the superimposition object 91.

It is preferable that the moving direction of the intermediate image 21 is in the longitudinal direction of the screen 13 (the intermediate image 21). This is to efficiently move the virtual image 25 in the longitudinal direction. It is preferable that the moving distance of the intermediate image 21 is approximately ±5.0 mm in consideration of variation of each component included in the display device 1. By ensuring this moving range, it is possible to deal with most of horizontal-angle deviation that is caused by substantial errors (errors in a manufacturing process, an assembly process, a viewing location, or the like). Furthermore, the moving direction of the intermediate image 21 may be any direction that includes a longitudinal-direction component other than the above-described one. Furthermore, the screen 13 may include not only a flat surface but also a curved surface.

As described above, the methods for moving the intermediate image 21 include a method for mechanically moving the intermediate-image formation unit and a method for moving only the intermediate image 21 within the screen 13. It is preferable to use the method for moving only the intermediate image 21 within the screen 13 as the method for mechanically moving the intermediate-image formation unit has significant problems such as an increase in workload, the size of the apparatus, costs, or the like.

For example, the control unit 511 (see FIG. 6) controls the emission timing of the light source unit 11, operation of the scan mirror 12, or the like, so as to move only the intermediate image 21 within the screen 13. As is the case with the first embodiment, the control unit 511 performs control in accordance with for example the algorithm described below. With regard to all or part of the intermediate image 21 formed on the screen 13, a polynomial for linearly moving a pixel is calculated on the basis of the amount of deviation from the reference location, and by using the calculated polynomial, geometric transformation is conducted to move the pixel to the target reference location. Thus, all or part of the intermediate image 21 that deviates from the reference location may be moved to the reference location.

Figure 15:
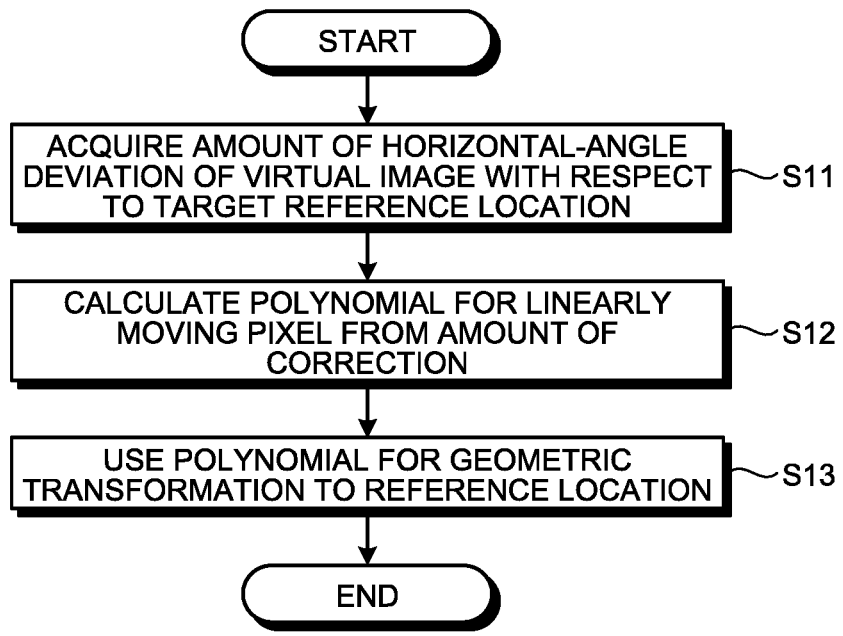
FIG. 15 is a flowchart that illustrates an algorithm for a correction process according to the second embodiment.

FIG. 15 is a flowchart that illustrates an algorithm for the correction process according to the second embodiment. The control unit 511 first acquires the amount of horizontal-angle deviation of the virtual image 25 with respect to the target reference location (S11). Then, the control unit 511 calculates the amount of correction for a pixel included in the intermediate image 21 formed on the screen 13 in accordance with the amount of horizontal-angle deviation that has been acquired and calculates a polynomial for linearly moving the pixel from the amount of correction (S12). Then, the control unit 511 uses the calculated polynomial to control emission of the light source unit 11, thereby conducting geometric transformation to move the pixel to the reference location (S13). Furthermore, the present embodiment is not a limitation as long as the objective is achieved. For example, although the amount of horizontal-angle deviation of the virtual image 25 is acquired based on the target reference location according to the present embodiment, the amount of horizontal-angle deviation may be an approximate value that is experimentally obtained.

Furthermore, the above-described movement of the intermediate image 21 may be made for only the specific display information 95 within the virtual image 25. For example, only the display information 95 superimposed on the superimposition object 91 may be moved in a parallel fashion among the pieces of display information 95 that are present in the virtual image 25.

As described above, according to the second embodiment, horizontal-angle deviation of the virtual image 25 is corrected by moving the intermediate image 21. Thus, it is possible to easily correct defects of virtual images due to any factors without increasing workload, the size of the apparatus, costs, and the like.

Third Embodiment

A display device according to the present embodiment includes both the correction unit described in the first embodiment (the unit that adjusts the level of the virtual image 25 and corrects defects regarding tilt or distortion) and the correction unit described in the second embodiment (the unit that corrects defects regarding horizontal-angle deviation of the virtual image 25). In actuality, tilt, distortion, level misalignment, horizontal-angle deviation, and the like, occur in a mixed manner in the virtual image 25 that is projected by a completed product in which the display device 1 is assembled in a vehicle, or the like. It is difficult to deal with the defects occurring with multiple factors mixed by using only the correction unit described in the first embodiment or only the correction unit described in the second embodiment. Therefore, sometimes the above-described defective components partially remain.

Therefore, the display device 1 with fewer defects may be provided by including both the correction unit described in the first embodiment and the correction unit described in the second embodiment.

In the environment described below, a correction process is performed to correct defects of the virtual image 25 by using the above-described display device 1.

Fourth Embodiment

Figure 16:
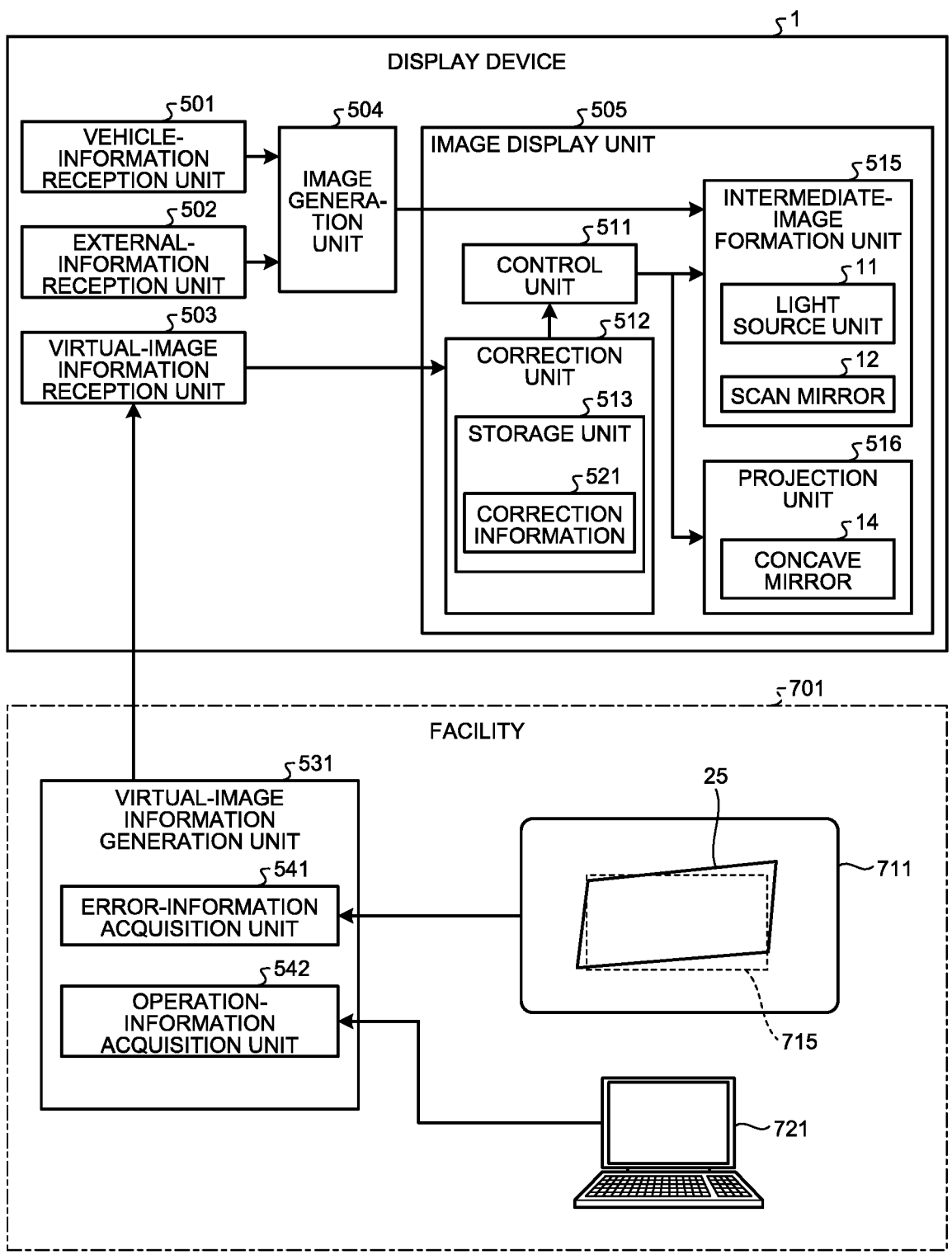
FIG. 16 is a diagram that illustrates an implementation environment for a correction process according to a fourth embodiment.

FIG. 16 is a diagram that illustrates an implementation environment for a correction process according to a fourth embodiment. The present embodiment describes a correction process performed in a facility 701 for manufacturing or assembling the display device 1. The facility 701 includes a factory for performing a manufacturing process to manufacture the display device 1 itself, a factory for performing an assembly process to assemble the completed display device 1 in an apparatus such as a vehicle, or the like. The correction process according to the present embodiment may be performed, for example, during examination conducted after the display device 1 is manufactured (before the display device 1 is shipped), during examination conducted after the shipped (examined) display device 1 is assembled in the apparatus (before the apparatus is shipped), or the like.

The facility 701 according to the present embodiment includes a virtual-image information generation unit 531. The virtual-image information generation unit 531 is a functional unit that generates virtual image information used to correct the virtual image 25 presented by the display device 1 that is the target to be examined. The virtual-image information generation unit 531 may be configured by using an information processing apparatus, an image taking apparatus, or the like, which is included in the facility 701 and is operated by an operator, or the like. Generated virtual image information is input to the virtual-image information reception unit 503 in the display device 1. The correction unit 512 in the display device 1 performs a process to correct the virtual image 25 on the basis of the input virtual image information.

The virtual-image information generation unit 531 according to the present embodiment includes an error-information acquisition unit 541 and an operation-information acquisition unit 542. The error-information acquisition unit 541 is a functional unit that acquires error information that indicates the difference in shape between the virtual image 25, which is the target to be examined, and an ideal virtual image 715 that has an ideal shape. The error information may include, for example, tilt of the virtual image 25 (a larger value between θ1 and θ2, an average value of θ1 and θ2, or the like), distortion (a larger value between D1 and D2, an average value of θ1 and θ2, or the like), horizontal-angle deviation (the amount of deviation D, or the like), and the like. The method for acquiring error information is not particularly limited, and for example there is a possible method that the virtual image 25 of the display device 1, which is the target to be examined, is displayed on a screen 711 for examination, the difference in shape between the virtual image 25 and the ideal virtual image 715 is detected on the screen 711 by using a predetermined information processing apparatus, and data is generated by quantifying a detection result. This type of method for acquiring error information may be automated by using an information processing apparatus, an image taking apparatus, or the like, which is controlled by a predetermined program.

The operation-information acquisition unit 542 is a functional unit that acquires information input by an operator using a predetermined information processing apparatus 721. Thus, any information manually input by an operator (e.g., information obtained when the virtual image 25 is viewed) may be treated as virtual image information. The correction unit 512 rotates the intermediate image 21 to correct a defect of the virtual image 25 on the basis of the virtual image information obtained as described above.

The above-described correction process according to the present embodiment enables correction on defects of the virtual image 25 due to errors in a manufacturing process or an assembly process during examination of the display device 1, during examination of the apparatus in which the display device 1 is assembled, or the like. Thus, errors unique to the display device 1 or the apparatus (vehicle, or the like) may be eliminated so that the image quality of the virtual image 25 may be improved.

Fifth Embodiment

Figure 17:
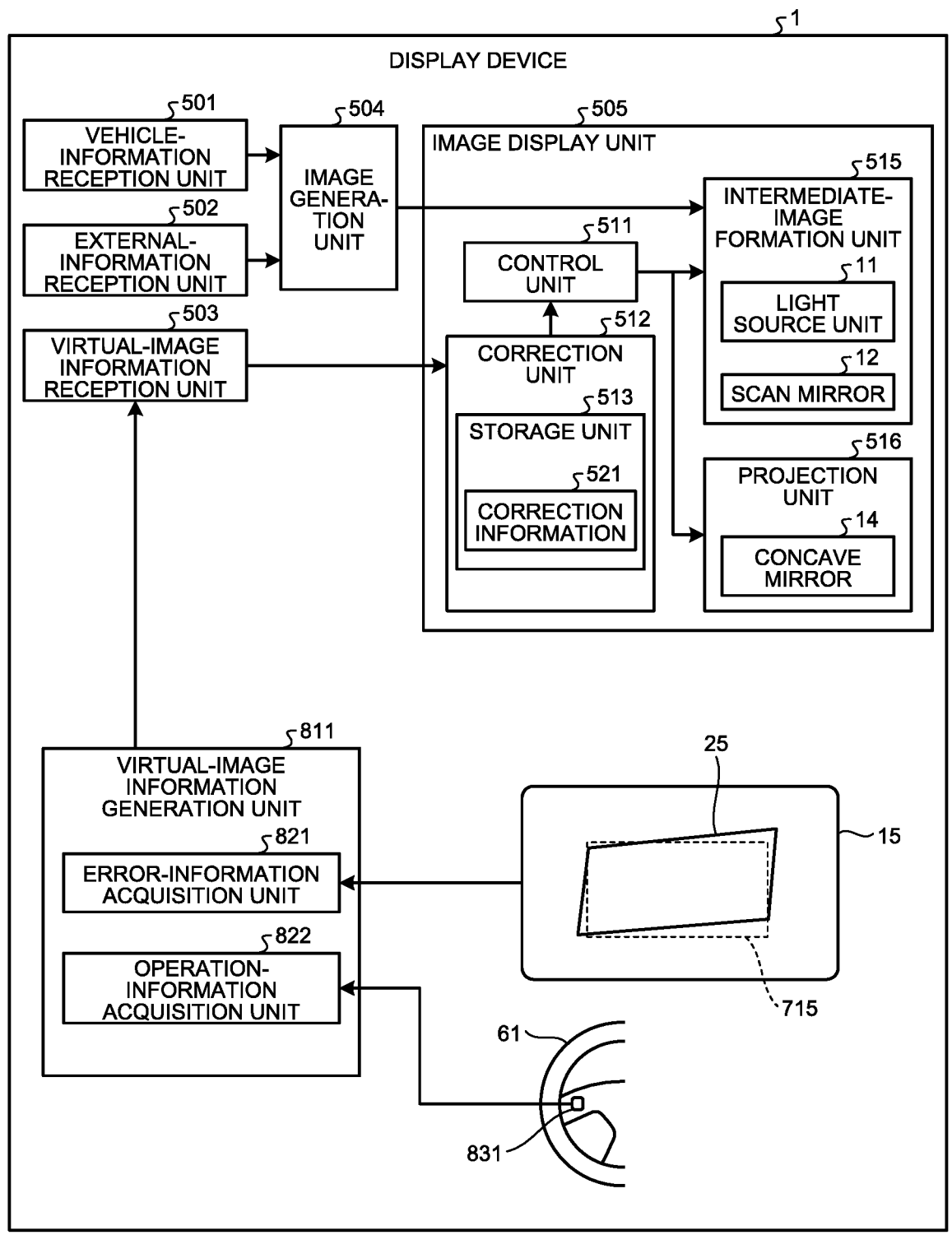
FIG. 17 is a diagram that illustrates an implementation environment for a correction process according to a fifth embodiment.

FIG. 17 is a diagram that illustrates an implementation environment for a correction process according to a fifth embodiment. A display device 801 according to the present embodiment includes a virtual-image information generation unit 811 in addition to the configuration of the display device 1 illustrated in FIG. 6. The present embodiment describes a correction process performed by the viewer 10 while the display device 801 is in use.

The virtual-image information generation unit 811 according to the present embodiment includes an error-information acquisition unit 821 and an operation-information acquisition unit 822. Similarly to the error-information acquisition unit 541 according to the fourth embodiment illustrated in FIG. 16, the error-information acquisition unit 821 is a functional unit that acquires error information that indicates the difference in shape between the virtual image 25, which is the target to be examined, and the ideal virtual image 715. The error-information acquisition unit 821 according to the present embodiment detects the difference in shape between the virtual image 25 and the ideal virtual image 715 on the front windshield 15 and treats the detected information as error information. This type of method for acquiring error information may be automated by operation of the CPU 102, or the like, which is controlled by a predetermined program stored in the ROM 103.

The operation-information acquisition unit 822 according to the present embodiment is a functional unit that acquires information that is input by the viewer 10 using a predetermined operating unit (e.g., a switch 831 included in a steering wheel 61 of the vehicle) included in the apparatus. Thus, any information (e.g., operation information that indicates a direction for correcting tilt, distortion, or horizontal-angle deviation of the virtual image 25) manually input by the viewer 10 may be treated as virtual image information. The correction unit 512 rotates the intermediate image 21 so as to correct defects of the virtual image 25 on the basis of the virtual image information that is obtained as described above.

The above-described correction process according to the present embodiment enables correction on defects of the virtual image 25 due to the viewing location of the viewer 10, or the like, while the display device 801 is in use. Thus, a difference in the viewing location, or the like, which is different depending on the viewer 10, may be eliminated, and the image quality of the virtual image 25 may be improved.

According to the present invention, it is possible to easily correct defects of virtual images caused by any factors.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. A display device, comprising:
    an intermediate-image formation unit configured to form an intermediate image on a screen;
    a projection unit configured to project the intermediate image toward a member to display a virtual image, wherein the member transmits a portion of incident light flux and reflects a remaining portion of the incident light flux;
    circuitry configured to receive virtual image information about the virtual image, and rotate the intermediate image within the screen to correct a defect of the virtual image, based on the received virtual image information,
    wherein the defect includes tilt or distortion of the virtual image, and the circuitry is further configured to rotate the intermediate image so that the virtual image is less tilted or distorted.

2. The display device according to claim 1, wherein the circuitry is further configured to rotate only two sides in a longitudinal direction among four sides forming the intermediate image that is rectangular.

3. The display device according to claim 1, wherein the virtual image is displayed by being superimposed in a real space that is viewed through the member, and the circuitry is further configured to move the intermediate image within the screen to correct deviation of a superimposition location of the virtual image.

4. The display device according to claim 3, wherein the circuitry is further configured to change an angle of a mirror reflecting light emitted from the screen to the member so as to correct deviation of the superimposition location of the virtual image in a vertical direction.

5. The display device according to claim 1, wherein the received virtual image information includes an error between an actual shape of the virtual image and an ideal shape of the virtual image.

6. The display device according to claim 1, wherein the circuitry is further configured to control operation of the intermediate-image formation unit in accordance with correction information generated based on the virtual image information.

7. The display device according to claim 6, wherein the intermediate-image formation unit includes a light source configured to emit laser light and a scan unit configured to scan the screen with the laser light, and the circuitry is further configured to control emission timing of the laser light.

8. The display device according to claim 1, further comprising:
    an operating interface configured to be operated by a viewer that views the virtual image, and
    virtual-image information generation circuitry configured to generate the virtual image information based on operation performed on the operating interface.

9. An apparatus, comprising:
    the display device according to claim 1; and
    the member.

10. The display device of claim 1, wherein the circuitry is further configured to receive information regarding the tilt or the distortion of the virtual image as the virtual image information.

\* \* \* \* \*